US010438608B2

(12) United States Patent
Ikeda (10) Patent No.: US 10,438,608 B2
(45) Date of Patent: Oct. 8, 2019

(54) NOISE SUPPRESSION CIRCUIT, COMMUNICATION DEVICE, NOISE SUPPRESSION METHOD, AND NON-TRANSITORY COMPUTER-READABLE RECORDING MEDIUM STORING PROGRAM

(71) Applicant: ICOM INCORPORATED, Osaka-shi, Osaka (JP)

(72) Inventor: Shoichi Ikeda, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 15/956,796

(22) Filed: Apr. 19, 2018

(65) Prior Publication Data

US 2018/0366137 A1 Dec. 20, 2018

(30) Foreign Application Priority Data

Jun. 16, 2017 (JP) ................................. 2017-118374

(51) Int. Cl.
*G10L 21/0264* (2013.01)
*G10L 15/20* (2006.01)
*G10L 21/0232* (2013.01)

(52) U.S. Cl.
CPC .......... *G10L 21/0264* (2013.01); *G10L 15/20* (2013.01); *G10L 21/0232* (2013.01)

(58) Field of Classification Search
CPC .. G10L 21/0264; G10L 15/20; G10L 21/0232
See application file for complete search history.

(56) References Cited

U.S. PATENT DOCUMENTS

| 2002/0178004 | A1* | 11/2002 | Chang ..................... G10L 15/07 704/246 |
| 2012/0136655 | A1  | 5/2012  | Yamabe |
| 2016/0064002 | A1* | 3/2016  | Kim ......................... G10L 15/22 704/246 |
| 2018/0059155 | A1* | 3/2018  | Nakayama ............. G01R 23/16 |

FOREIGN PATENT DOCUMENTS

| JP | 11-231897 A   | 8/1999 |
| JP | 2012-133346 A | 7/2012 |

* cited by examiner

*Primary Examiner* — Sonia L Gay
(74) *Attorney, Agent, or Firm* — Ohlandt, Greeley, Ruggiero & Perle, L.L.P.

(57) ABSTRACT

An FFT processor applies the fast Fourier transform to each frame of an input signal and generates frequency domain data. A first spectrum calculator calculates the amplitude spectrum of the input signal for the individual frequency components based on the frequency domain data. A dispersion index calculator calculates a dispersion index indicating the level of dispersion of the amplitude spectrum of the input signal in the latest frames. A noise index calculator calculates a noise index indicating the level of noise contained in the input signal. A second spectrum calculator calculates the amplitude spectrum of the noise for the individual frequency components. A gain calculator calculates a spectral gain for suppressing the noise for the individual frequency components. An IFFT processor applies the inverse fast Fourier transform to the frequency domain data after multiplication by the spectral gain at a multiplier, and generates a signal to be output.

17 Claims, 10 Drawing Sheets

NOISE SUPPRESSION CIRCUIT, COMMUNICATION DEVICE, NOISE SUPPRESSION METHOD, AND NON-TRANSITORY COMPUTER-READABLE RECORDING MEDIUM STORING PROGRAM

CROSS-REFERENCE TO RELATED APPLICATION

This application claims the benefit of Japanese Patent Application No. 2017-118374, filed on Jun. 16, 2017, the entire disclosure of which is incorporated by reference herein.

FIELD

This application relates to a noise suppression circuit for attenuating noise, a communication device, a noise suppression method, and a non-transitory computer-readable recording medium storing a program.

BACKGROUND

During a call via a communication device, contamination of environmental noise into speech collected at a microphone of the device reduces the rate of successful speech recognition. In order to prevent such a reduction in the rate of successful speech recognition, in a transmission mode, the noise contained in a speech signal must be attenuated before transmission of the speech signal. In addition, in a reception mode, the noise contained in a reception signal must be attenuated before output of the reception signal.

A speech recognition device disclosed in Unexamined Japanese Patent Application Kokai Publication No. 1999-231897 analyzes an input signal from a single microphone and determines the spectrum of the signal immediately before a speech period to be a noise spectrum. The speech recognition device subtracts the noise spectrum from the spectrum within the entire speech period to acquire the spectrum within the speech period without noise. A speech processing apparatus disclosed in Unexamined Japanese Patent Application Kokai Publication No. 2012-133346 calculates the total energy of a spectrum group containing a given spectrum and neighboring spectra in a spectral pattern, and sequentially calculates the total energies while shifting the focus on the spectrum one by one. The speech processing apparatus then detects a peak spectrum based on the energy ratio between the total energy of a target spectrum group and the total energy of an adjacent spectrum group. The speech processing apparatus uses the barycentric frequency of the peak spectrum to determine the noise spectrum depending on the number of barycentric frequencies having a harmonic relationship, and thus suppresses the noise spectrum.

SUMMARY

A noise suppression circuit according to a first aspect of the disclosure includes: an FFT processor that divides an input signal into frames, applies the fast Fourier transform to each frame of the input signal, and generates frequency domain data; a first spectrum calculator that calculates the amplitude spectrum of the input signal for the individual frequency components of the input signal based on the frequency domain data; a dispersion index calculator that calculates a dispersion index for the individual frequency components, the dispersion index indicating the level of dispersion of the amplitude spectrum of the input signal in the latest frames; a noise index calculator that calculates a noise index based on the dispersion index, the noise index indicating the level of noise contained in the input signal; a second spectrum calculator that calculates the amplitude spectrum of the noise for the individual frequency components based on the amplitude spectrum of the input signal and the noise index; a gain calculator that calculates a spectral gain for suppressing the noise for the individual frequency components based on the amplitude spectrum of the input signal and the amplitude spectrum of the noise; a multiplier that multiplies the frequency domain data by the spectral gain; and an IFFT processor that applies the inverse fast Fourier transform to the frequency domain data after multiplication by the spectral gain, and generates a signal to be output.

Preferably, the amplitude spectrum of the noise calculated at the second spectrum calculator may be the moving average of the amplitude spectrum of the input signal in the latest frames for the individual frequency components, the moving average being weighted by a factor associated with the noise index.

Preferably, the factor associated with the noise index may be a product of the noise index and an index adjustment factor. The index adjustment factor, if the amplitude spectrum of the input signal is equal to or larger than the amplitude spectrum of the noise for the preceding frame, may be smaller than the index adjustment factor, if the amplitude spectrum of the input signal is smaller than the amplitude spectrum of the noise for the preceding frame.

Preferably, the moving average of the amplitude spectrum of the input signal weighted by the factor associated with the noise index may be calculated with a linear low-pass filter based on the factor associated with the noise index.

Preferably, the dispersion index may be the moving average of a deviation, the deviation being the absolute value of the difference between the amplitude spectrum of the input signal and a reference value.

Preferably, the reference value may be the moving average of the amplitude spectrum of the input signal.

Preferably, the dispersion index may be calculated with a linear low-pass filter based on a first factor. The reference value may be calculated with a linear low-pass filter based on a second factor. If the deviation is equal to or larger than the deviation for the preceding frame, the first factor is larger than the second factor. If the deviation is smaller than the deviation for the preceding frame, the first factor is smaller than the second factor.

Preferably, the noise index may be a function of a variable, the variable being calculated by dividing the dispersion index by the reference value.

Preferably, the gain calculator may adjust the spectral gain by multiplying the spectral gain by a gain adjustment factor, adding 1, and then subtracting the gain adjustment factor, the gain adjustment factor being equal to or larger than 0 and equal to or smaller than 1. The multiplier may multiply the frequency domain data by the adjusted spectral gain.

A communication device according to a second aspect of the disclosure includes: an inputter that collects environmental sounds and generates a speech signal; the above-described noise suppression circuit, the noise suppression circuit processing the speech signal; a transmission processing circuitry that generates a transmission signal based on the signal output from the noise suppression circuit; and an antenna that transmits the transmission signal.

A communication device according to a third aspect of the disclosure includes: an antenna that receives a signal; a reception processing circuitry that demodulates the signal received at the antenna and generates a reception signal; the above-described noise suppression circuit, the noise suppression circuit processing the reception signal; and an outputter that outputs speech based on the signal output from the noise suppression circuit.

A communication device according to a fourth aspect of the disclosure includes: an inputter that collects environmental sounds and generates a speech signal; a first noise suppression circuit that is the above-described noise suppression circuit, the first noise suppression circuit processing the speech signal; a transmission processing circuitry that generates a transmission signal based on the signal output from the first noise suppression circuit processing the speech signal; an antenna that transmits the transmission signal and receives a signal; a reception processing circuitry that demodulates the signal received at the antenna and generates a reception signal; a second noise suppression circuit that is the above-described noise suppression circuit, the second noise suppression circuit processing the reception signal; and an outputter that outputs speech based on the signal output from the second noise suppression circuit processing the reception signal.

A noise suppression method according to a fifth aspect of the disclosure includes: dividing an input signal into frames, applying the fast Fourier transform to each frame of the input signal, and generating frequency domain data; calculating the amplitude spectrum of the input signal for the individual frequency components of the input signal based on the frequency domain data; calculating a dispersion index for the individual frequency components, the dispersion index indicating the level of dispersion of the amplitude spectrum of the input signal in the latest frames; calculating a noise index based on the dispersion index, the noise index indicating the level of noise contained in the input signal; calculating the amplitude spectrum of the noise for the individual frequency components based on the amplitude spectrum of the input signal and the noise index; calculating a spectral gain for suppressing the noise for the individual frequency components based on the amplitude spectrum of the input signal and the amplitude spectrum of the noise; multiplying the frequency domain data by the spectral gain; and applying the inverse fast Fourier transform to the frequency domain data after multiplication by the spectral gain, and generates a signal to be output.

A non-transitory computer-readable recording medium according to a sixth aspect of the disclosure stores a program, the program causing a computer to function as: an FFT processor that divides an input signal into frames, applies the fast Fourier transform to each frame of the input signal, and generates frequency domain data; a first spectrum calculator that calculates the amplitude spectrum of the input signal for the individual frequency components of the input signal based on the frequency domain data; a dispersion index calculator that calculates a dispersion index for the individual frequency components, the dispersion index indicating the level of dispersion of the amplitude spectrum of the input signal in the latest frames; a noise index calculator that calculates a noise index based on the dispersion index, the noise index indicating the level of noise contained in the input signal; a second spectrum calculator that calculates the amplitude spectrum of the noise for the individual frequency components based on the amplitude spectrum of the input signal and the noise index; a gain calculator that calculates a spectral gain for suppressing the noise for the individual frequency components based on the amplitude spectrum of the input signal and the amplitude spectrum of the noise; a multiplier that multiplies the frequency domain data by the spectral gain; and an IFFT processor that applies the inverse fast Fourier transform to the frequency domain data after multiplication by the spectral gain, and generates a signal to be output.

According to the disclosure, the amplitude spectrum of the noise contained in the input signal is calculated based on the amplitude spectrum of the input signal and the noise index indicating the level of the noise. This configuration can simplify the process of noise suppression for attenuating noise depending on a variation in the noise.

BRIEF DESCRIPTION OF THE DRAWINGS

A more complete understanding of this application can be obtained when the following detailed description is considered in conjunction with the following drawings, in which.

DETAILED DESCRIPTION

The speech recognition device disclosed in Unexamined Japanese Patent Application Kokai Publication No. 1999-231897 subtracts the spectrum of the signal immediately before a speech period from the spectrum within the entire speech period. The speech recognition device can thus attenuate the noise in the speech period but cannot attenuate the noise in a silent period. In general, a communication device is required to attenuate the noise not only in a speech period but also in a silent period, in which a tone signal is transmitted and received, for example. In addition, the speech recognition device disclosed in Unexamined Japanese Patent Application Kokai Publication No. 1999-231897 may fail to sufficiently attenuate noise or may attenuate speech by mistake in the case of a variation in noise characteristics. The speech recognition device determines the period in which the amplitude of a signal exceeds a threshold to be a speech period, and is therefore more likely to cause a malfunction as the noise increases.

The speech processing apparatus disclosed in Unexamined Japanese Patent Application Kokai Publication No. 2012-133346 requires a long time for the complicated process of calculating a peak spectrum and determining a noise spectrum. Furthermore, the speech processing apparatus determines a signal having no harmonic structure and a signal having a harmonic structure but no periodicity to be noise. The speech processing apparatus thus may determine an unvoiced sound having no periodicity, such as a sibilant, to be noise by mistake.

An objective of the disclosure, which has been accomplished to solve the above problems, is to simplify the process of noise suppression for attenuating noise depending on a variation in the noise.

Embodiments of the disclosure is described in detail with reference to the following drawings. In the drawings, the components identical or equivalent to each other are provided with the same reference signs.

Figure 1:
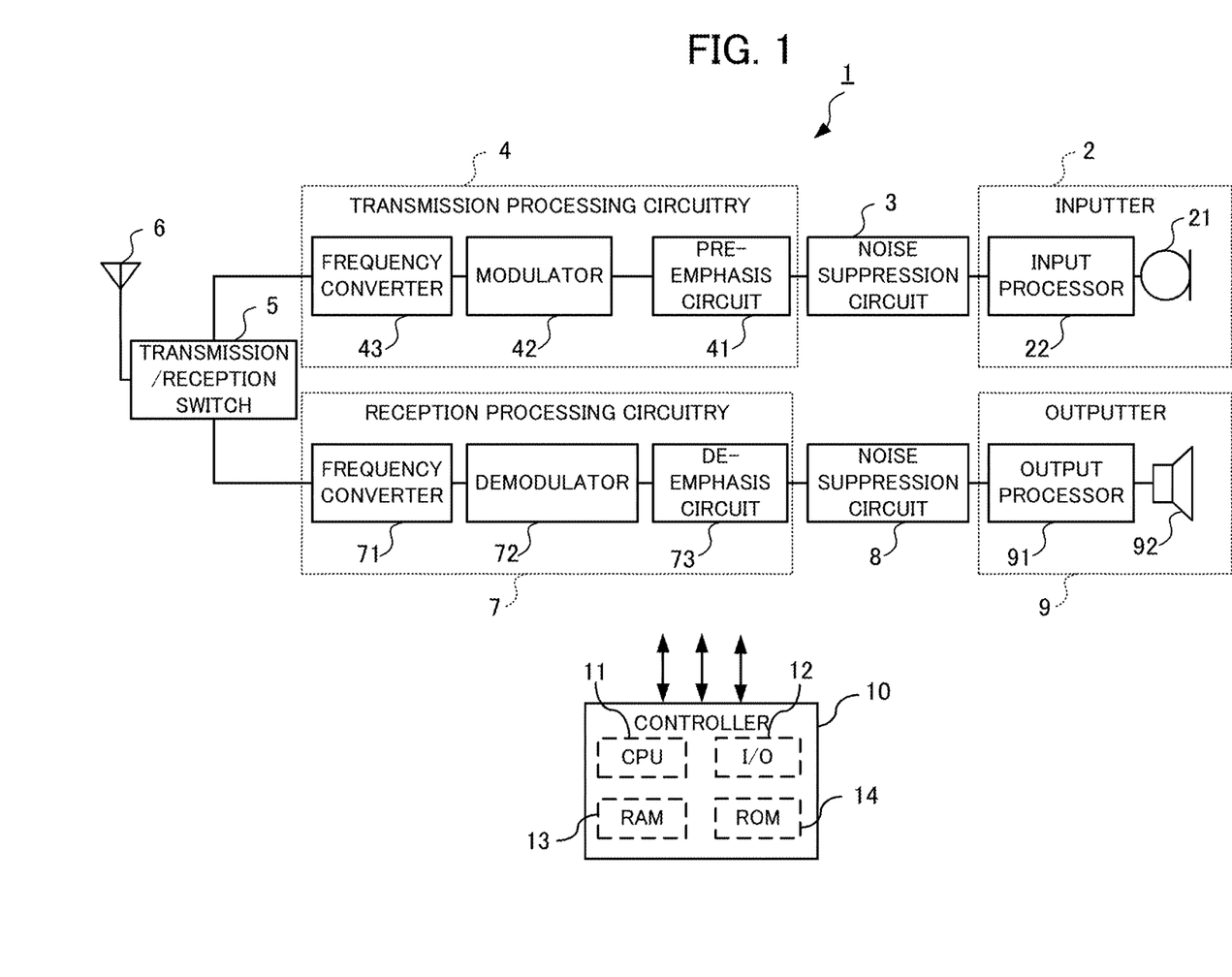
FIG. 1 is a block diagram illustrating an exemplary configuration of a communication device according to an embodiment of the disclosure.

FIG. 1 is a block diagram illustrating an exemplary configuration of a communication device according to an embodiment of the disclosure. A communication device 1 includes an inputter 2 that collects environmental sounds and generates a speech signal, a noise suppression circuit 3 (serving as a first noise suppression circuit) that reduces noise contained in the speech signal generated at the inputter 2, and a transmission processing circuitry 4 that generates a transmission signal based on the signal output from the noise suppression circuit 3. The communication device 1 further includes a transmission/reception switch 5 that switches mode between transmission and reception. The communication device 1 further includes an antenna 6, a reception processing circuitry 7 that demodulates signal received at the antenna 6 and generates a reception signal, a noise suppression circuit 8 (serving as a second noise suppression circuit) that reduces the noise contained in the reception signal generated at the reception processing circuitry 7, and an outputter 9 that outputs speech based on signal output from the noise suppression circuit 8. If a transmitting communication device and a receiving communication device are separately provided, the transmitting communication device includes the inputter 2, the noise suppression circuit 3, the transmission processing circuitry 4, and the antenna 6, whereas the receiving communication device includes the antenna 6, the reception processing circuitry 7, the noise suppression circuit 8, and the outputter 9.

The inputter 2 includes a microphone 21, and an input processor 22 that processes signal output from the microphone 21 and generates a speech signal. The microphone 21 collects environmental sounds, converts the environmental sounds into an electrical signal, and then outputs the electrical signal. The input processor 22 includes, for example, an amplifier and a low-pass filter (LPF). The input processor 22 processes the electrical signal output from the microphone 21 through, for example, amplification and removal of high-frequency components, and generates a speech signal. The transmission processing circuitry 4 includes a pre-emphasis circuit 41, a modulator 42, and a frequency converter 43. The pre-emphasis circuit 41 outputs a signal at a level proportional to frequency of the signal output from the noise suppression circuit 3 (that is, differentiates frequency of the signal output from the noise suppression circuit 3). The pre-emphasis circuit 41 then preliminarily increases relative intensity of the high-frequency components of the signal output from the noise suppression circuit 3 in order to improve signal-to-noise (S/N) ratio in a receiving device. The modulator 42 modulates a carrier wave output from a local oscillator (not shown) depending on the signal output from the pre-emphasis circuit 41. A modulation scheme is, for example, frequency modulation or single side band (SSB) modulation. The frequency converter 43 converts frequency of the carrier wave modulated at the modulator 42 into radio frequency (RF) band, and generates a transmission signal. The transmission signal is output via the transmission/reception switch 5 to the antenna 6, and then transmitted from the antenna 6.

The reception processing circuitry 7 includes a frequency converter 71, a demodulator 72, and a de-emphasis circuit 73. The frequency converter 71 converts the frequency of a signal, which is received at the antenna 6 and input into the frequency converter 71 via the transmission/reception switch 5, into intermediate frequency (IF) band. The demodulator 72 demodulates the signal of which the frequency is converted into the IF band. The de-emphasis circuit 73 attenuates the high-frequency components of the signal demodulated at the demodulator 72, and generates a demodulated signal. The outputter 9 includes an output processor 91 that processes the demodulated signal, and a speaker 92 that outputs speech based on the demodulated signal processed at the output processor 91. The output processor 91 includes, for example, an amplifier and an LPF. The output processor 91 processes the demodulated signal through, for example, amplification and removal of the high-frequency components.

The individual components of the communication device 1 are controlled by a controller 10. The controller 10 includes a central processing unit (CPU) 11, a random access memory (RAM) 13, and a read-only memory (ROM) 14. Signal lines connecting the controller 10 to the individual components are not shown for the purposes of simplification and facilitation of understanding. The controller 10 is connected to the individual components of the communication device 1 via an input/output (I/O) 12, and controls the start, end, and the steps of the processes. The ROM 14 stores a control program for allowing the controller 10 to control operations of the communication device 1. The controller 10 controls the individual components of the communication device 1 under instructions of the control program.

Figure 2:
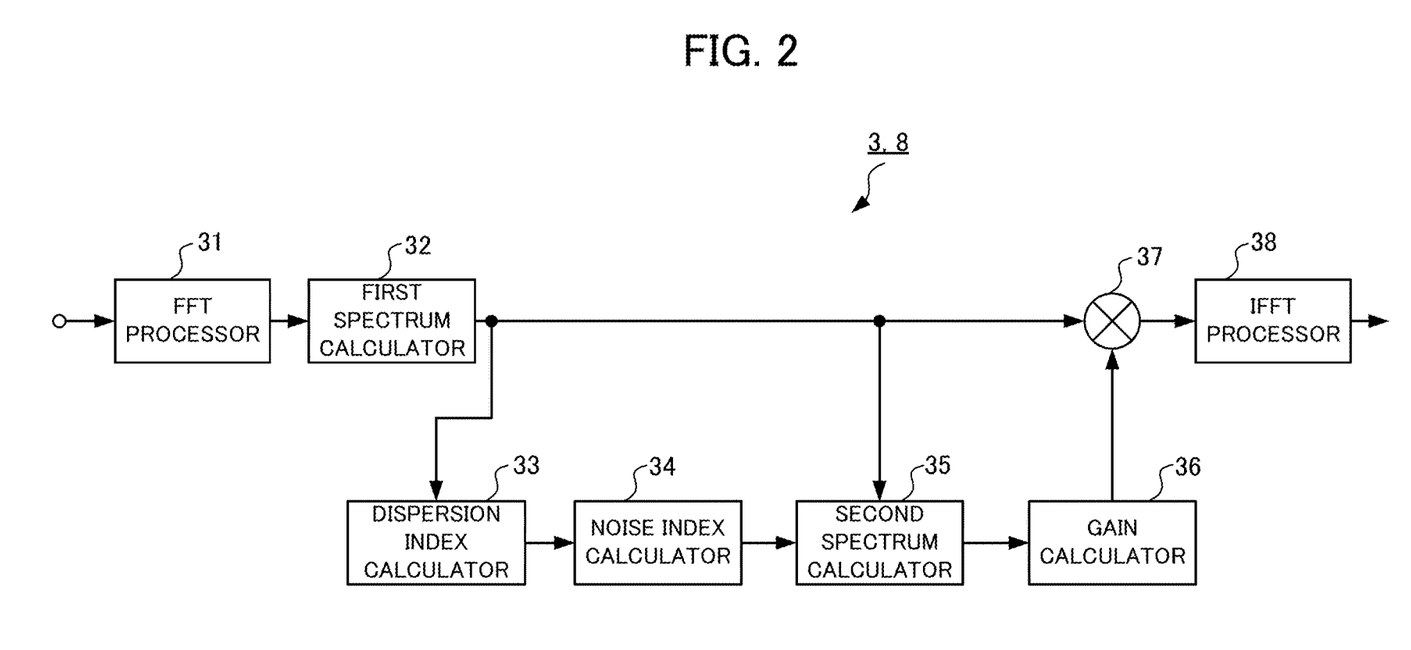
FIG. 2 is a block diagram illustrating an exemplary configuration of a noise suppression circuit according to the embodiment.

FIG. 2 is a block diagram illustrating an exemplary configuration of the noise suppression circuit according to the embodiment. The noise suppression circuits 3 and 8 have the identical configuration and operation, and thus the following description focuses on the configuration and operation of the noise suppression circuit 3. The noise suppression circuit 3 includes an FFT processor 31 that divides an input signal into frames, applies fast Fourier transform (FFT) to each frame of the input signal, and generates frequency domain data. The signal input into the noise suppression circuit 3 is the speech signal generated at the input processor 22. The noise suppression circuit 3 further includes a first spectrum calculator 32 that calculates the amplitude spectrum of the input signal for the individual frequency components based on the frequency domain data, a dispersion index calculator 33 that calculates a dispersion index indicating a level of dispersion of the amplitude spectrum of the input signal in the latest frames, and a noise index calculator 34 that calculates a noise index indicating a level of the noise contained in the input signal based on the dispersion index. The noise suppression circuit 3 further includes a second spectrum calculator 35 that calculates the amplitude spectrum of the noise, a gain calculator 36 that calculates a spectral gain for suppressing the noise, a multiplier 37, and an IFFT processor 38 that applies inverse fast Fourier transform (IFFT) to the frequency domain data after multiplication by the spectral gain at the multiplier 37, and generates a signal to be output.

The FFT processor 31 divides an input signal x(t) into frames by multiplying the input signal x(t) by a window function. The FFT processor 31 then applies the FFT to each frame of the input signal x(t) and generates frequency domain data X(f), which is a complex number. The k-th element of the frequency domain data X(f) is represented by Expression 1 below, where Re[k] is a real part and Im[k] is an imaginary part. In Expression 1, j indicates the imaginary unit. The integral number k has the range of 0≤k≤N−1 (where N indicates the FFT size). The k-th frequency component f[k], which corresponds to the k-th element of the frequency domain data X(f), is represented by Expression 2 below, where $f_s$ indicates the sampling frequency. The first spectrum calculator 32 then calculates the amplitude spectrum |X| of the input signal for the individual frequency components f[k] based on the frequency domain data X(f). The amplitude spectrum |X| is represented by Expression 3 below. The amplitude spectrum |X| of the input signal is stored into a memory (not shown) included in the noise suppression circuit 3.

[Expression 1]

$$X(f) = \text{Re}[k] + j \cdot \text{Im}[k] \quad (1)$$

[Expression 2]

$$f[k] = \frac{f_s}{N} \cdot k \quad (2)$$

[Expression 3]

$$|X| = \sqrt{\text{Re}[k]^2 + \text{Im}[k]^2} \quad (3)$$

The dispersion index calculator 33 calculates a dispersion index, which indicates the level of dispersion of the amplitude spectrum |X| of the input signal in the latest frames, for the individual frequency components f[k]. The dispersion index may be a mean square deviation. In order to simplify the process, for example, the dispersion index may be replaced with the moving average of a deviation D, which is the absolute value of the difference between the amplitude spectrum of the input signal and a reference value, in the latest frames. The reference value is, for example, the moving average of the amplitude spectrum of the input signal in the latest frames, or a fixed value.

The calculation of the moving average of the deviation D and the calculation of the reference value may use any number of frames. The number of frames used in the calculation of the moving average of the deviation D may be identical to or different from the number of frames used in the calculation of the reference value. In this embodiment, the dispersion index calculator 33 calculates the moving average of the deviation D and the reference value for the frames from the first frame to the latest frame. The reference value is the moving average of the amplitude spectrum |X| of the input signal in these frames. The deviation D is represented by Expression 4 below, and the dispersion index V is represented by Expression 5 below. In Expressions 4 and 5, $|X|_{avg}$ indicates the reference value, which is the moving average of the amplitude spectrum |X| of the input signal for the frames from the first frame to the latest frame. The reference value $|X|_{avg}$, the deviation D, and the dispersion index V are stored into the memory (not shown) included in the noise suppression circuit 3.

[Expression 4]

$$D = ||X| - |X|_{avg}| \quad (4)$$

[Expression 5]

$$V = ||X| - |X|_{avg}|_{avg} \quad (5)$$

The first frame is, for example, the first one of the frames generated from the input signal that enters the noise suppression circuit 3 for the first time since the activation of the communication device 1. For this first frame, the dispersion index calculator 33 calculates the amplitude spectrum |X| of the input signal. The dispersion index calculator 33 then sets the initial value of the reference value $|X|_{avg}$ to be the amplitude spectrum |X| of the input signal calculated based on the first frame. The dispersion index calculator 33 also sets the initial values of the deviation D and the dispersion index V to be 0.

Alternatively, the communication device 1 may include a noise suppression circuit 3 used in common for transmission and reception. In this case, the first frame may also be the first one of the frames generated from the input signal that enters the noise suppression circuit 3 for the first time since the switching between transmission and reception. Alternatively, the noise suppression circuit 3 may be turned on and off by an operation of the communication device 1. In this case, the first frame may also be the first one of the frames generated from the input signal that entered the noise suppression circuit 3 for the first time since the noise suppression circuit 3 is turned on after the elapse of a certain period of inactivation of the noise suppression circuit 3 from the activation of the communication device 1.

Examples of the moving average include a simple moving average, weighted moving average, and exponential moving average. The dispersion index V can be calculated with a linear LPF having unity DC gain based on a first factor. The linear LPF having unity DC gain is deemed to calculate an infinite exponential moving average. The calculation of the dispersion index V with the linear LPF having unity DC gain is easier than the calculation of a dispersion index that is a mean square deviation.

Figure 3:
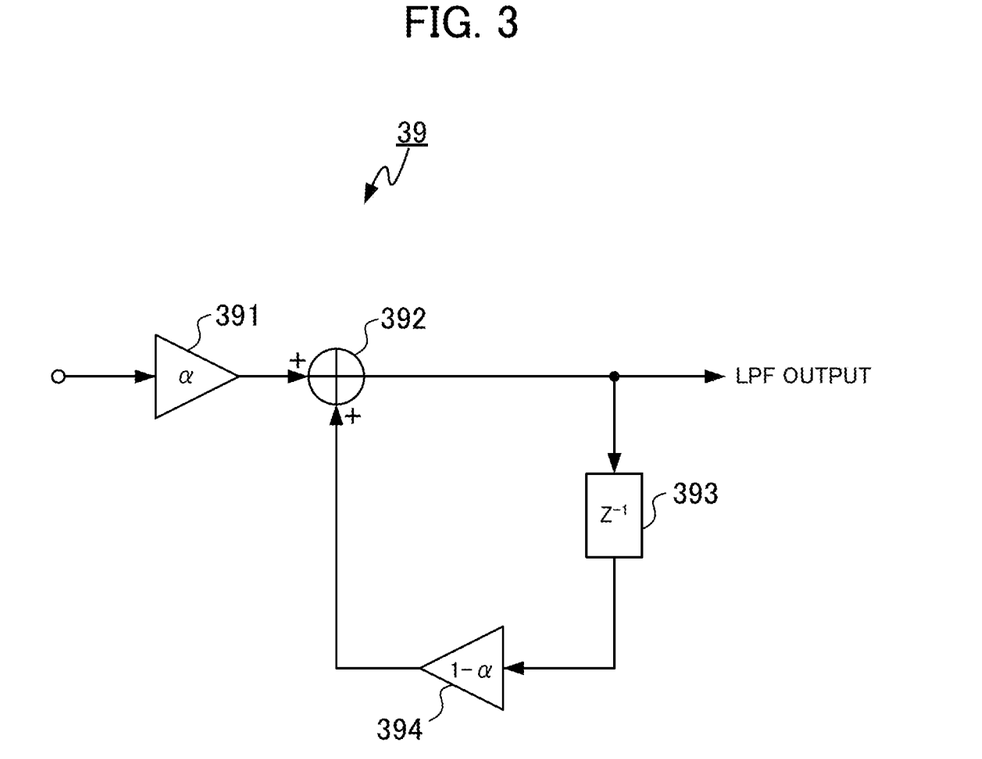
FIG. 3 is a block diagram illustrating an exemplary configuration of a low-pass filter (LPF) according to the embodiment.

FIG. 3 is a block diagram illustrating an exemplary configuration of the LPF according to the embodiment. The LPF 39 includes a multiplier 391 that performs multiplication by a filter factor α, an adder 392, a delay element 393, and a multiplier 394 that performs multiplication by a value (1−α). The multiplier 391 and the adder 392 are connected in series. The LPF output is fed back via the delay element 393 and the multiplier 394 to the adder 392. The adder 392 outputs the sum of the outputs from the multipliers 391 and 394. The dispersion index V is derived from the LPF output. The LPF 39 illustrated in FIG. 3 requires only a single data buffer and thus has a simplified configuration of processing circuitry. In the same way, the deviation D can be calculated with a linear LPF having unity DC gain based on a second factor. The transfer function H(z) of the LPF 39 illustrated in FIG. 3 is represented by Expression 6 below, where α indicates the filter factor.

[Expression 6]

$$H(z) = \frac{\alpha}{1 - (1-\alpha)z^{-1}} \quad (6)$$

The magnitude relationship between the first and second factors may be variable depending on a change in the deviation D. The following description focuses on an exemplary calculation of the dispersion index V for the m-th frame. The memory included in the noise suppression circuit 3 has stored the amplitude spectrum |X|[m−1] of the input signal, the reference value $|X|_{avg}$[m−1], the deviation D[m−

1], and the dispersion index V[m−1] based on the (m−1)-th frame. The dispersion index calculator 33 calculates the amplitude spectrum |X|[m] of the input signal, and then calculates a reference value |X|$_{avg}$[m] based on the amplitude spectrum |X|[m] of the input signal and the reference value |X|$_{avg}$[m−1] for the preceding frame. The dispersion index calculator 33 then calculates a deviation D[m] based on the amplitude spectrum |X|[m] of the input signal and the reference value |X|avg[m].

If the deviation D[m] is equal to or larger than the deviation D[m−1] for the preceding frame, the first factor is set to be larger than the second factor. The dispersion index calculator 33 uses the LPF 39 based on the first factor larger than the second factor to calculate the dispersion index V[m], based on the deviation D[m] and the dispersion index V[m−1]. If the deviation D[m] is smaller than the deviation D[m−1] for the preceding frame, the first factor is set to be smaller than the second factor. The dispersion index calculator 33 uses the LPF 39 based on the first factor smaller than the second factor to calculate the dispersion index V[m], based on the deviation D[m] and the dispersion index V[m−1]. The first factor larger than the second factor causes the dispersion index V to follow a change more rapidly. In contrast, the first factor smaller than the second factor prevents a sudden change in the dispersion index V.

The noise index calculator 34 calculates a noise index indicating the level of the noise contained in the input signal based on the dispersion index V. The noise index is, for example, a function of a variable, the variable being calculated by dividing the dispersion index V by the reference value. In this embodiment, the normalized dispersion index V$_{norm}$, which is the value calculated by dividing the dispersion index V by the reference value, is represented by Expression 7 below.

[Expression 7]
$$V_{norm} = \frac{||X| - |X|_{avg}|_{avg}}{|X|_{avg}} \quad (7)$$

Figure 4:
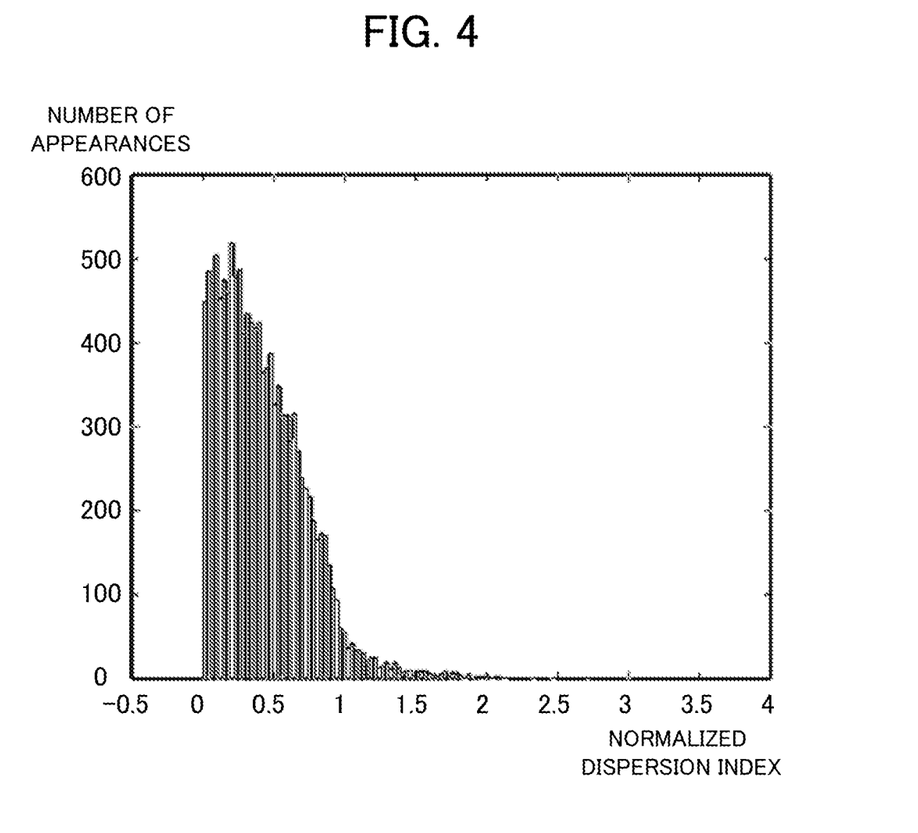
FIG. 4 illustrates an exemplary normalized dispersion index according to the embodiment.
Figure 5:
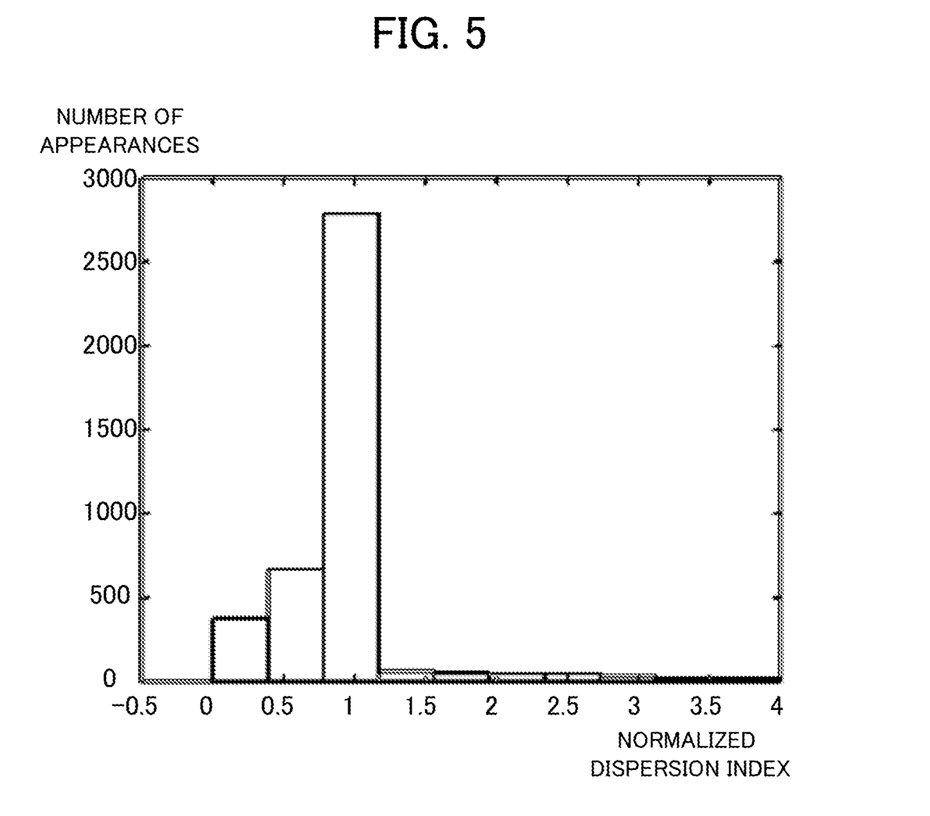
FIG. 5 illustrates another exemplary normalized dispersion index according to the embodiment.
Figure 6:
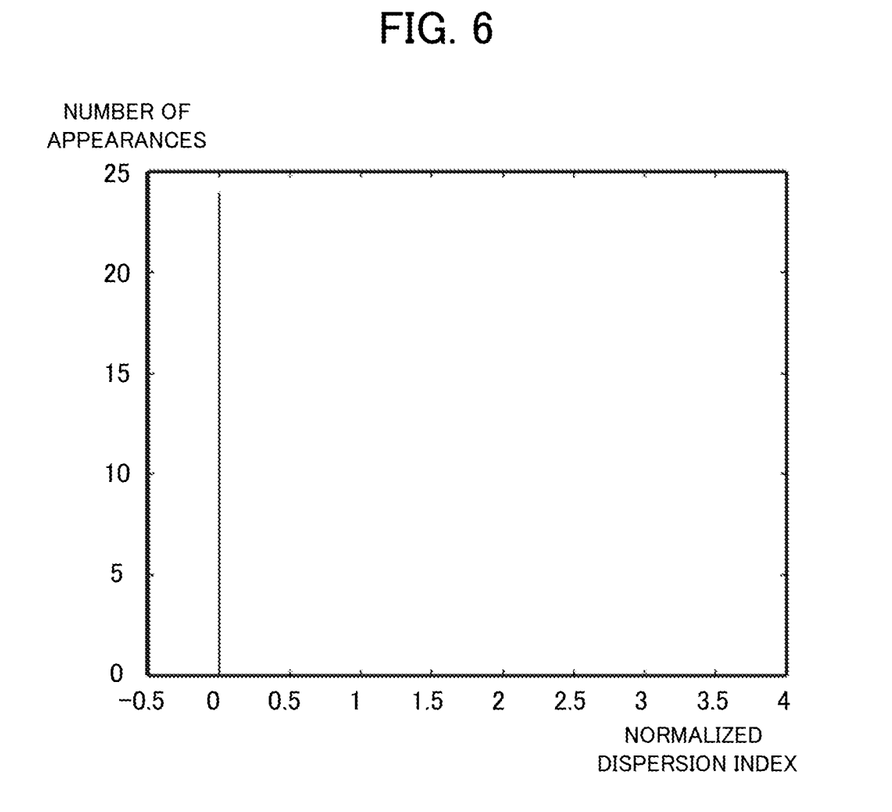
FIG. 6 illustrates another exemplary normalized dispersion index according to the embodiment.

The value of the normalized dispersion index V$_{norm}$ varies depending on the characteristics of the input signal. FIGS. 4 to 6 each illustrate an exemplary normalized dispersion index according to the embodiment. In FIGS. 4 to 6, the horizontal axis indicates the normalized dispersion index V$_{norm}$ and the vertical axis indicates the number of appearances of the normalized dispersion index V$_{norm}$. In the example illustrated in FIG. 4, the input signal is normally distributed noise. If the input signal is normally distributed noise, the average of the possible values of the normalized dispersion index V$_{norm}$ is 0.42. In the example illustrated in FIG. 4, as the normalized dispersion index V$_{norm}$ approaches 1, the number of appearances rapidly decreases. The number of appearances of the normalized dispersion index V$_{norm}$ equal to or larger than 1 is significantly smaller than the number of appearances of the normalized dispersion index V$_{norm}$ smaller than 1.

In the example illustrated in FIG. 5, the input signal is a speech signal. If the input signal is a speech signal, the average of the possible values of the normalized dispersion index V$_{norm}$ is 1.37. In the example illustrated in FIG. 5, as the normalized dispersion index V$_{norm}$ approaches 1, the number of appearances increases. That is, the dispersion of the amplitude spectrum of the speech signal is larger than the dispersion of the amplitude spectrum of the noise.

In the example illustrated in FIG. 6, the input signal is a 1 kHz tone signal. The amplitude spectrum of the tone signal is significantly stable in comparison to those of the speech signal and noise. In the example illustrated in FIG. 6, the average of the possible values of the normalized dispersion index V$_{norm}$ is 0.0. In other words, the amplitude spectrum of the input signal is deemed to have no dispersion.

Figure 7:
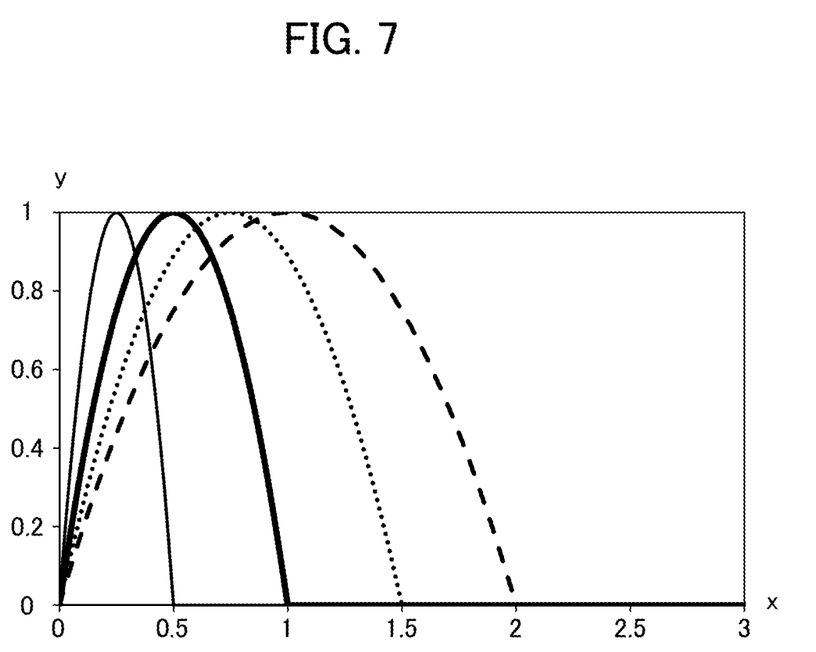
FIG. 7 illustrates exemplary noise indexes according to the embodiment.

In this embodiment, the noise index indicating the level of the noise contained in the input signal is calculated based on the normalized dispersion index V$_{norm}$. For example, the noise index y is represented by Expression 8 below, where the variable x indicates the normalized dispersion index V$_{norm}$. FIG. 7 illustrates exemplary noise indexes according to the embodiment. In FIG. 7, the horizontal axis indicates x and the vertical axis indicates y. The factors a$_1$ and a$_2$ can be determined such that the noise index y is equal to or larger than 0 and equal to or smaller than 1 if the variable x is in a predetermined range. The thin solid line in FIG. 7 represents the function of the noise index y in the case of a$_1$=8 and a$_2$=−16. The thick solid line in FIG. 7 represents the function of the noise index y in the case of a$_1$=4 and a$_2$=−4. The dotted line in FIG. 7 represents the function of the noise index y in the case of a$_1$=2.6667 and a$_2$=−1.7778. The dashed line in FIG. 7 represents the function of the noise index y in the case of a$_1$=2 and a$_2$=−1.

[Expression 8]

$$y = \max(a_1 x + a_2 x^2, 0) \quad (8)$$

The second spectrum calculator 35 calculates the amplitude spectrum of the noise for the individual frequency components based on the amplitude spectrum of the input signal and the noise index y. The amplitude spectrum of the noise calculated at the second spectrum calculator 35 is the moving average of the amplitude spectrum of the input signal, weighted by a factor associated with the noise index y, in the latest frames for the individual frequency components. In this embodiment, the second spectrum calculator 35 calculates the amplitude spectrum of the noise based on the frames from the first frame to the latest frame. The amplitude spectrum |Y| of the noise can be calculated with a linear LPF having unity DC gain based on the factor associated with the noise index y, like the dispersion index V and the deviation D. The amplitude spectrum |Y| of the noise is stored into the memory (not shown) included in the noise suppression circuit 3.

According to the function of the noise index in the case of a$_1$=4 and a$_2$=−4, the noise index y is 0 in the ranges of x≤0 and 1≤x. In the case of y=0, the factor of the LPF 39 illustrated in FIG. 3 is 0, so that the amplitude spectrum |Y| of the noise does not vary from the amplitude spectrum |Y| of the noise for the preceding frame. That is, in the ranges of x≤0 and 1≤x, the input signal is deemed as not noise, and thus is not used for calculation of the amplitude spectrum of the noise.

In contrast, in the range of 0<x<1, the range of the noise index y is 0<y≤1 in the above example. In this case, the factor of the LPF 39 illustrated in FIG. 3 is larger than 0 and equal to or smaller than 1. The amplitude spectrum |Y| of the noise is calculated based on the amplitude spectrum |X| of the input signal weighted by the noise index and can thus reflect the level of the noise contained in the input signal. That is, the amplitude spectrum |Y| of the noise calculated at the second spectrum calculator 35 follows a change in the noise contained in the input signal. The determination of the level of the noise contained in the input signal based on the noise index, which is a function of a variable, the variable being the normalized dispersion index $V_{norm}$, can provide higher accuracy than the determination of the noise based on the amplitude of the signal.

In this embodiment, the factor associated with the noise index is the product of the noise index and an index adjustment factor. The index adjustment factor, if the amplitude spectrum |X| of the input signal is equal to or larger than the amplitude spectrum |Y| of the noise for the preceding frame, is smaller than the index adjustment factor, if the amplitude spectrum |X| of the input signal is smaller than the amplitude spectrum |Y| of the noise for the preceding frame.

The following description focuses on an exemplary calculation of the amplitude spectrum |Y| of the noise for the m-th frame. The memory included in the noise suppression circuit 3 has stored the amplitude spectrum |Y|[m−1] of the noise for the (m−1)-th frame. If the amplitude spectrum |X|[m] of the input signal is equal to or larger than the amplitude spectrum |Y|[m−1] of the noise for the preceding frame, the index adjustment factor is set to be $b_1$. The second spectrum calculator 35 uses the LPF 39 based on the factor calculated by multiplying the noise index by the index adjustment factor $b_1$, to calculate the amplitude spectrum |Y|[m] of the noise based on the amplitude spectrum |X|[m] of the input signal and the amplitude spectrum |Y|[m−1] of the noise for the preceding frame. If the amplitude spectrum |X|[m] of the input signal is smaller than the amplitude spectrum |Y|[m−1] of the noise for the preceding frame, the index adjustment factor is set to be $b_2$. The second spectrum calculator 35 uses the LPF 39 based on the factor calculated by multiplying the noise index by the index adjustment factor $b_2$, to calculate the amplitude spectrum |Y|[m] of the noise based on the amplitude spectrum |X|[m] of the input signal and the amplitude spectrum |Y|[m−1] of the noise for the preceding frame. It should be noted that the index adjustment factor $b_1$ is smaller than the index adjustment factor $b_2$.

Such an index adjustment factor can prevent a sudden change in the amplitude spectrum |Y| of the noise if the amplitude spectrum |X| of the input signal is equal to or larger than the amplitude spectrum |Y| of the noise for the preceding frame. In contrast, if the amplitude spectrum |X| of the input signal is smaller than the amplitude spectrum |Y| of the noise for the preceding frame, the amplitude spectrum |Y| of the noise follows a change more rapidly.

The gain calculator 36 calculates a spectral gain for suppressing the noise for the individual frequency components based on the amplitude spectrum |X| of the input signal and the amplitude spectrum |Y| of the noise. The posterior signal-to-noise ratio (SNR) γ is represented by Expression 9 below.

[Expression 9]

$$\gamma = \frac{|X|^2}{|Y|^2} \tag{9}$$

In the calculation of the spectral gain for the m-th frame, the prior SNR ξ is represented by Expression 10 below, for example, using the decision directed algorithm. The frequency domain data X[m] is the sum of the speech signal S[m] and the noise Y[m] contained in the frequency domain data X[m] (X[m]=S[m]+Y[m]). In Expression 10, β indicates the ratio of reflection of the values for the preceding frame. G[m−1] indicates the spectral gain calculated for the preceding frame or the (m−1)-th frame. $\sigma_S$ indicates the dispersion of the amplitude spectrum of the speech signal, and $\sigma_Y$ indicates the dispersion of the amplitude spectrum of the noise.

[Expression 10]

$$\begin{aligned}\xi[m] &= \frac{\sigma_S^2[m]}{\sigma_Y^2} \\ &\approx \beta \frac{S^2[m-1]}{\sigma_Y^2} + (1-\beta)\frac{S^2[m]}{\sigma_Y^2} \\ &\approx \beta \frac{G^2[m-1] \cdot X^2[m-1]}{\sigma_Y^2} + (1-\beta)\frac{X^2[m] - \sigma_Y^2}{\sigma_Y^2} \\ &= \beta \cdot \gamma[m-1] \cdot G^2[m-1] + (1-\beta)(\gamma[m]-1) \\ &= \beta \cdot \gamma[m-1] \cdot G^2[m-1] + (1-\beta) \cdot \max(\gamma[m]-1, 0)\end{aligned} \tag{10}$$

The shape of the probability density distribution of the amplitude spectrum of the speech signal is defined by, for example, v represented by Expression 11 below. The integral number k has the range of 0≤k≤N−1 (where N indicates the FFT size) as in the above example.

[Expression 11]

$$v[m,k] = \begin{cases} 2.0 & (\tilde{v}[m,k] > 2.0) \\ \tilde{v}[m,k] & (0.0 \le \tilde{v}[m,k] \le 2.0) \\ 0.0 & (\tilde{v}[m,k] < 0.0) \end{cases} \tag{11}$$

$$\tilde{v}[m,k] = \alpha\left(10\log_{10}\frac{\sum_{k=0}^{N-1}|X[m,k]|^2}{\sum_{k=0}^{N-1}|Y[m,k]|^2}\right)$$

The gain calculator 36 calculates the spectral gain G using Expression 12 below. In Expression 12, μ indicates a parameter that defines the shape of the distribution of the amplitude spectrum of the speech signal.

[Expression 12]

$$G = u + \sqrt{u^2 + \frac{v}{2\gamma}} \tag{12}$$

$$u = \frac{1}{2} - \frac{\mu}{4}\sqrt{\frac{1}{\gamma\xi}}$$

The gain calculator 36 may adjust the spectral gain G by multiplying the spectral gain G by a gain adjustment factor, which is equal to or larger than 0 and equal to or smaller than 1, adding 1 to the resulting value, and then subtracting the gain adjustment factor from the resulting value. The adjusted spectral gain G' is represented by Expression 13 below. In Expression 13, DEPTH indicates the gain adjustment factor, which is equal to or larger than 0 and equal to or smaller than 1. The adjustment of the spectral gain G using the gain adjustment factor can vary the extent of application of the noise suppression.

[Expression 13]

$$G = G \cdot \text{DEPTH} + (1.0 - \text{DEPTH}) \tag{13}$$

Figure 8:
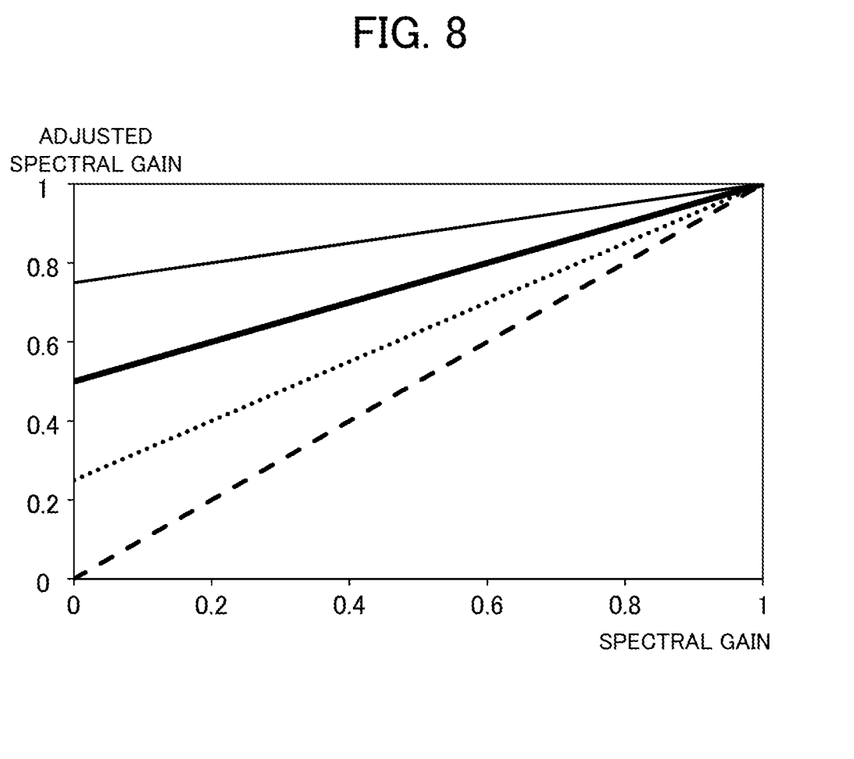
FIG. 8 illustrates an exemplary adjustment of a spectral gain according to the embodiment.

The above calculation is executed in the Q15 format, and thus the maximum value of DEPTH is 0x7FFF whereas the minimum value is 0x0001. FIG. 8 illustrates an exemplary adjustment of the spectral gain according to the embodiment. In FIG. 8, the horizontal axis indicates the spectral gain G and the vertical axis indicates the adjusted spectral gain G'. The thin solid line in FIG. 8 represents the adjusted spectral gain G' in the case of DEPTH=0.25. The thick solid line represents the adjusted spectral gain G' in the case of DEPTH=0.5. The dotted line represents the adjusted spectral gain G' in the case of DEPTH=0.75. The dashed line represents the adjusted spectral gain G' in the case of the maximum DEPTH.

The multiplier 37 multiplies each element of the frequency domain data by the spectral gain calculated for the individual frequency components, and outputs the resulting data to the IFFT processor 38. If the gain calculator 36 adjusts the spectral gain G using the gain adjustment factor, the multiplier 37 multiplies each element of the frequency domain data by the adjusted spectral gain G'. The IFFT processor 38 applies the IFFT to the frequency domain data after multiplication by the spectral gain at the multiplier 37, and generates a signal to be output.

Figure 9:
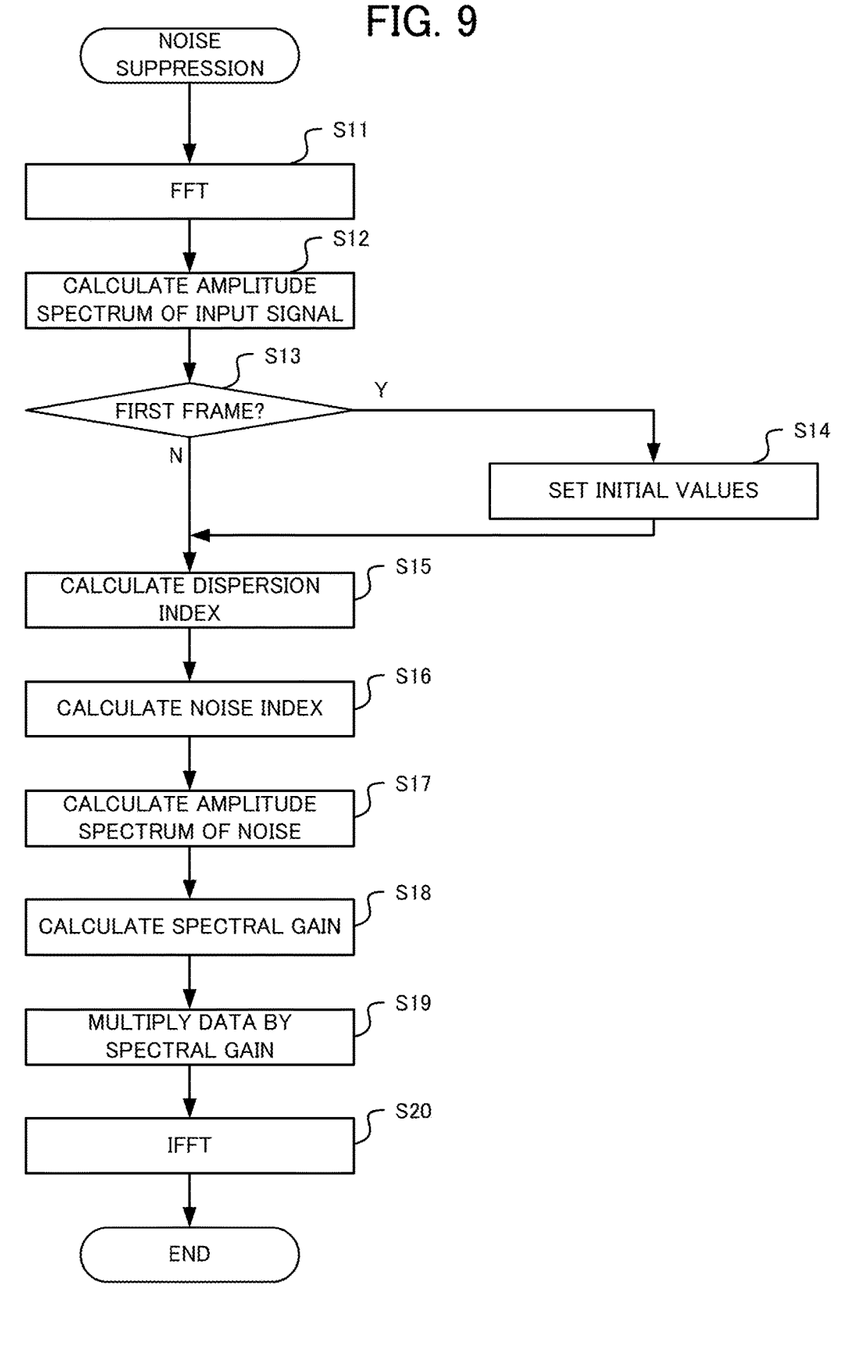
FIG. 9 is a flowchart illustrating an exemplary process of noise suppression executed at the noise suppression circuit according to the embodiment.

FIG. 9 is a flowchart illustrating an exemplary process of noise suppression executed at the noise suppression circuit according to the embodiment. In response to input of a signal into the noise suppression circuit 3, the FFT processor 31 divides the input signal into frames, applies the FFT to each frame of the input signal, and generates frequency domain data (Step S11). The first spectrum calculator 32 then calculates the amplitude spectrum of the input signal for the individual frequency components based on the frequency domain data (Step S12). In the case of the first frame (Step S13; Y), the dispersion index calculator 33 sets the initial values (Step S14). In the case of other frame than the first frame (Step S13; N), the process skips Step S14 and goes to Step S15. The dispersion index calculator 33 calculates the dispersion index V, which is the moving average of the deviation D for the frames from the first frame to the latest frame (Step S15).

The noise index calculator 34 calculates the noise index, which is the function of a variable, the variable being calculated by dividing the dispersion index V by the reference value (Step S16). The second spectrum calculator 35 calculates the amplitude spectrum of the noise for the individual frequency components based on the amplitude spectrum of the input signal and the noise index (Step S17). The gain calculator 36 calculates the spectral gain for suppressing the noise for the individual frequency components based on the amplitude spectrum of the input signal and the amplitude spectrum of the noise (Step S18). The multiplier 37 multiplies each element of the frequency domain data by the spectral gain calculated for the individual frequency components (Step S19). The IFFT processor 38 applies the IFFT to the frequency domain data after multiplication by the spectral gain at the multiplier 37, and generates a signal to be output (Step S20). The noise suppression circuit 3 performs the above process to each frame of the input signal.

As described above, the noise suppression circuits 3 and 8 according to the embodiment calculate the amplitude spectrum of the noise based on the amplitude spectrum of the input signal and the noise index, and can thereby attenuate the noise depending on a variation in the noise. In addition, the calculation of the amplitude spectrum of the noise does not require sequential calculations of the total energies of successive spectrum groups, for example. The noise suppression circuits 3 and 8 according to the embodiment can thus simplify the process of noise suppression.

Figure 10:
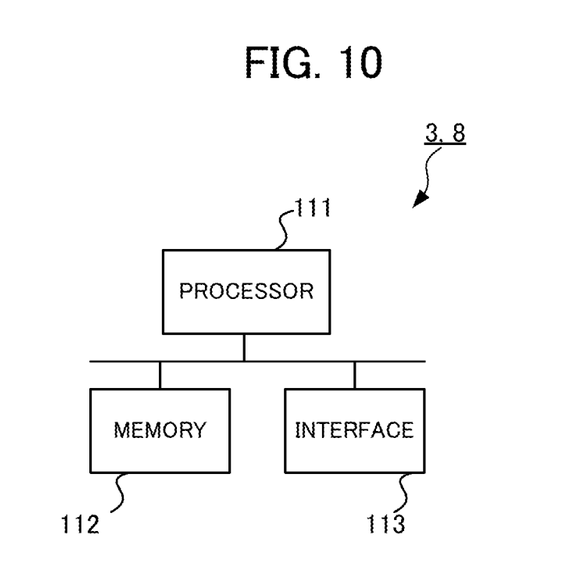
FIG. 10 illustrates an exemplary hardware configuration of the noise suppression circuit according to the embodiment of the disclosure.

FIG. 10 illustrates an exemplary hardware configuration of the noise suppression circuit according to the embodiment of the disclosure. The noise suppression circuits 3 and 8 each have a hardware configuration for controlling the circuit, which includes a processor 111, a memory 112, and an interface 113. The individual functions of the components are performed by execution of the program stored in the memory 112 by the processor 111. The interface 113 connects the noise suppression circuits 3 and 8 to the inputter 2, the transmission processing circuitry 4, the reception processing circuitry 7, the outputter 9, and the controller 10, and establishes communication therebetween. The interface 113 may include a plurality of types of interfaces as required. Although the exemplary configuration illustrated in FIG. 10 includes a single processor 111 and a single memory 112, the above functions may be performed by cooperation of a plurality of processors 111 and a plurality of memories 112.

The center for executing the control process, which includes the processor 111, the memory 112, and the interface 113, may be configured by a general computer system without a dedicated system. For example, a computer program for executing the above operations may be stored into a non-transitory computer-readable recording medium (for example, a flexible disk, a Compact Disk Read-Only-Memory (CD-ROM), or a Digital Versatile Disk Read-Only-Memory (DVD-ROM) and distributed. In this case, this computer program is installed into a computer, and thereby causes the computer to function as the noise suppression circuits 3 and 8 for executing the above operations. Alternatively, the computer program may be stored into a storage device of a server on a communication network. In this case, this computer program is downloaded into a general computer system, and thereby causes the system to function as the noise suppression circuits 3 and 8.

If the functions of the noise suppression circuits 3 and 8 are shared by an operating system (OS) and an application program or performed by cooperation of the OS and the application program, for example, the application program alone may be stored into the non-transitory recording medium or the storage device.

Alternatively, the computer program may be superimposed on a carrier wave and delivered via a communication network. For example, the computer program may be posted on a bulletin board system (BBS) on a communication network and thus delivered via the communication network. In this case, when this computer program is activated and executed under the control of the OS as well as other application programs, the computer program allows for execution of the above operations.

The above embodiments should not be construed to limit the scope of the disclosure. The circuit configuration illustrated in the embodiments is a mere example. The communication device 1 may also be a transmitter or a receiver. The noise suppression circuits 3 and 8 each can be achieved by a digital signal processor (DSP). The noise suppression circuits 3 and 8 can be applied to not only the communication device 1 but also an audio recording device, an audio playback device, and a loudspeaker, for example.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A noise suppression circuit comprising:
    an FFT processor that divides an input signal into frames, applies a fast Fourier transform to each frame of the input signal, and generates frequency domain data;
    a first spectrum calculator that calculates an amplitude spectrum of the input signal for individual frequency components based on the frequency domain data;
    a dispersion index calculator that calculates a dispersion index for the individual frequency components, the dispersion index indicating a level of dispersion of the amplitude spectrum of the input signal in latest frames;
    a noise index calculator that calculates a noise index based on the dispersion index, the noise index indicating a level of noise contained in the input signal;
    a second spectrum calculator that calculates an amplitude spectrum of the noise for the individual frequency components based on the amplitude spectrum of the input signal and the noise index;
    a gain calculator that calculates a spectral gain for suppressing the noise for the individual frequency components based on the amplitude spectrum of the input signal and the amplitude spectrum of the noise;
    a multiplier that multiplies the frequency domain data by the spectral gain; and
    an IFFT processor that applies an inverse fast Fourier transform to the frequency domain data after multiplication by the spectral gain, and generates a signal to be output, wherein
    the amplitude spectrum of the noise calculated at the second spectrum calculator is a moving average of the amplitude spectrum of the input signal in the latest frames for the individual frequency components, the moving average being weighted by a factor associated with the noise index;
    the factor associated with the noise index is a product of the noise index and an index adjustment factor; and
    the index adjustment factor, when the amplitude spectrum of the input signal is equal to or larger than the amplitude spectrum of the noise for a preceding frame, is smaller than the index adjustment factor, when the amplitude spectrum of the input signal is smaller than the amplitude spectrum of the noise for the preceding frame.

2. The noise suppression circuit according to claim 1, wherein the moving average of the amplitude spectrum of the input signal weighted by the factor associated with the noise index is calculated with a linear low-pass filter based on the factor associated with the noise index.

3. The noise suppression circuit according to claim 1, wherein the dispersion index is a moving average of a deviation, the deviation being an absolute value of a difference between the amplitude spectrum of the input signal and a reference value.

4. The noise suppression circuit according to claim 1, wherein the dispersion index is a moving average of a deviation, the deviation being an absolute value of a difference between the amplitude spectrum of the input signal and a reference value.

5. The noise suppression circuit according to claim 3, wherein the reference value is a moving average of the amplitude spectrum of the input signal.

6. The noise suppression circuit according to claim 4, wherein the reference value is a moving average of the amplitude spectrum of the input signal.

7. The noise suppression circuit according to claim 5, wherein
    the dispersion index is calculated with a linear low-pass filter based on a first factor,
    the reference value is calculated with a linear low-pass filter based on a second factor,
    if the deviation is equal to or larger than the deviation for a preceding frame, the first factor is larger than the second factor, and
    if the deviation is smaller than the deviation for the preceding frame, the first factor is smaller than the second factor.

8. The noise suppression circuit according to claim 3, wherein the noise index is a function of a variable, the variable being calculated by dividing the dispersion index by the reference value.

9. The noise suppression circuit according to claim 4, wherein the noise index is a function of a variable, the variable being calculated by dividing the dispersion index by the reference value.

10. The noise suppression circuit according to claim 5, wherein the noise index is a function of a variable, the variable being calculated by dividing the dispersion index by the reference value.

11. The noise suppression circuit according to claim 6, wherein the noise index is a function of a variable, the variable being calculated by dividing the dispersion index by the reference value.

12. The noise suppression circuit according to claim 1, wherein
    the gain calculator adjusts the spectral gain by multiplying the spectral gain by a gain adjustment factor, adding 1, and then subtracting the gain adjustment factor, the gain adjustment factor being equal to or larger than 0 and equal to or smaller than 1, and
    the multiplier multiplies the frequency domain data by the adjusted spectral gain.

13. A communication device comprising:
    an inputter that collects environmental sounds and generates a speech signal;
    the noise suppression circuit according to claim 1, the noise suppression circuit processing the speech signal;
    a transmission processing circuitry that generates a transmission signal based on the signal output from the noise suppression circuit; and
    an antenna that transmits the transmission signal.

14. A communication device comprising:
    an antenna that receives a signal;
    a reception processing circuitry that demodulates the signal received at the antenna and generates a reception signal;
    the noise suppression circuit according to claim 1, the noise suppression circuit processing the reception signal; and
    an outputter that outputs speech based on the signal output from the noise suppression circuit.

15. A communication device comprising:
    an inputter that collects environmental sounds and generates a speech signal;
    a first noise suppression circuit that is the noise suppression circuit according to claim 1, the first noise suppression circuit processing the speech signal;
    a transmission processing circuitry that generates a transmission signal based on the signal output from the first noise suppression circuit;
    an antenna that transmits the transmission signal and receives a signal;

a reception processing circuitry that demodulates the signal received at the antenna and generates a reception signal;

a second noise suppression circuit that is the noise suppression circuit according to claim 1, the second noise suppression circuit processing the reception signal; and an outputter that outputs speech based on the signal output from the second noise suppression circuit.

16. A noise suppression method comprising:

dividing an input signal into frames, applying a fast Fourier transform to each frame of the input signal, and generating frequency domain data;

calculating an amplitude spectrum of the input signal for individual frequency components based on the frequency domain data;

calculating a dispersion index for the individual frequency components, the dispersion index indicating a level of dispersion of the amplitude spectrum of the input signal in latest frames;

calculating a noise index based on the dispersion index, the noise index indicating a level of noise contained in the input signal;

calculating an amplitude spectrum of the noise for the individual frequency components based on the amplitude spectrum of the input signal and the noise index;

calculating a spectral gain for suppressing the noise for the individual frequency components based on the amplitude spectrum of the input signal and the amplitude spectrum of the noise;

multiplying the frequency domain data by the spectral gain; and applying an inverse fast Fourier transform to the frequency domain data after multiplication by the spectral gain, and generating a signal to be output, wherein the amplitude spectrum of the noise calculated at the second spectrum calculator is a moving average of the amplitude spectrum of the input signal in the latest frames for the individual frequency components, the moving average being weighted by a factor associated with the noise index;

the factor associated with the noise index is a product of the noise index and an index adjustment factor; and the index adjustment factor, when the amplitude spectrum of the input signal is equal to or larger than the amplitude spectrum of the noise for a preceding frame, is smaller than the index adjustment factor, when the amplitude spectrum of the input signal is smaller than the amplitude spectrum of the noise for the preceding frame.

17. A non-transitory computer-readable recording medium storing a program, the program causing a computer to function as:

an FFT processor that divides an input signal into frames, applies a fast Fourier transform to each frame of the input signal, and generates frequency domain data;

a first spectrum calculator that calculates an amplitude spectrum of the input signal for individual frequency components based on the frequency domain data;

a dispersion index calculator that calculates a dispersion index for the individual frequency components, the dispersion index indicating a level of dispersion of the amplitude spectrum of the input signal in latest frames;

a noise index calculator that calculates a noise index based on the dispersion index, the noise index indicating a level of noise contained in the input signal;

a second spectrum calculator that calculates an amplitude spectrum of the noise for the individual frequency components based on the amplitude spectrum of the input signal and the noise index;

a gain calculator that calculates a spectral gain for suppressing the noise for the individual frequency components based on the amplitude spectrum of the input signal and the amplitude spectrum of the noise;

a multiplier that multiplies the frequency domain data by the spectral gain; and an IFFT processor that applies an inverse fast Fourier transform to the frequency domain data after multiplication by the spectral gain, and generates a signal to be output, wherein the amplitude spectrum of the noise calculated at the second spectrum calculator is a moving average of the amplitude spectrum of the input signal in the latest frames for the individual frequency components, the moving average being weighted by a factor associated with the noise index;

the factor associated with the noise index is a product of the noise index and an index adjustment factor; and the index adjustment factor, when the amplitude spectrum of the input signal is equal to or larger than the amplitude spectrum of the noise for a preceding frame, is smaller than the index adjustment factor, when the amplitude spectrum of the input signal is smaller than the amplitude spectrum of the noise for the preceding frame.

* * * * *